(12) United States Patent
Zein et al.

(10) Patent No.: US 10,711,445 B2
(45) Date of Patent: Jul. 14, 2020

(54) SUCTION DEVICE FOR A WASTEWATER TANK

(71) Applicant: Hugo Vogelsang Maschinenbau GmbH, Essen (DE)

(72) Inventors: Bilal Zein, Essen Oldenburg (DE); Martin Heinrichs, Essen Oldenburg (DE)

(73) Assignee: HUGO VOGELSANG MASCHINENBAU GMBH, Essen (DE)

( * ) Notice: Subject to any disclaimer, the term of this patent is extended or adjusted under 35 U.S.C. 154(b) by 0 days.

(21) Appl. No.: 16/096,718

(22) PCT Filed: Apr. 27, 2017

(86) PCT No.: PCT/EP2017/060081
§ 371 (c)(1),
(2) Date: Oct. 26, 2018

(87) PCT Pub. No.: WO2017/186858
PCT Pub. Date: Nov. 2, 2017

(65) Prior Publication Data
US 2019/0145090 A1 May 16, 2019

(30) Foreign Application Priority Data

Apr. 27, 2016 (DE) .................... 20 2016 102 246 U (51) Int. Cl.
*E03F 1/00* (2006.01)
*B61D 35/00* (2006.01)
(Continued)

(52) U.S. Cl.
CPC ............ *E03F 1/008* (2013.01); *B01D 29/055* (2013.01); *B01D 35/147* (2013.01);
(Continued)

(58) Field of Classification Search
CPC ..... Y10T 137/86348; Y10T 137/86372; Y10T 137/8085; B01D 29/055; B01D 35/1475;
(Continued)

(56) References Cited

U.S. PATENT DOCUMENTS

| 3,528,462 A | 9/1970 | Quase |
| 3,666,103 A | 5/1972 | Green |

(Continued)

FOREIGN PATENT DOCUMENTS

| DE | 8900672 | 6/1989 |
| DE | 102010032852 | 2/2012 |

(Continued)

*Primary Examiner* — Atif H Chaudry
(74) *Attorney, Agent, or Firm* — Price Heneveld LLP (57) ABSTRACT

The invention relates to a sanitary arrangement, in particular, a mobile sanitary arrangement in a motor vehicle such as a coach, having a wastewater-collection tank which has a floor and a sidewall that enclose a tank interior, and an inlet connection and an outlet device. The outlet device has an outlet opening with a connection coupling for the connection of a suction-extraction arrangement and a suction-extraction channel, which, starting from the outlet opening, extends downward in the direction of gravitational force to an intake opening within the wastewater-collection tank.

14 Claims, 7 Drawing Sheets

(51) Int. Cl.
*B60R 15/04* (2006.01)
*B67D 1/08* (2006.01)
*B01D 35/147* (2006.01)
*B65D 83/32* (2006.01)
*B01D 29/05* (2006.01)

(52) U.S. Cl.
CPC .......... *B01D 35/1475* (2013.01); *B60R 15/04* (2013.01); *B61D 35/007* (2013.01); *B65D 83/32* (2013.01); *B67D 1/0802* (2013.01); *Y10T 137/8085* (2015.04); *Y10T 137/86348* (2015.04); *Y10T 137/86372* (2015.04)

(58) Field of Classification Search
CPC .... B01D 35/147; B65D 83/32; B67D 1/0802; E03F 1/008; B61D 35/007; B60R 15/04
See application file for complete search history.

(56) References Cited

U.S. PATENT DOCUMENTS

| | | | |
|---|---|---|---|
| 3,904,131 A * | 9/1975 | Farrell, Jr. | B02C 18/0092 241/46.02 |
| 4,067,663 A * | 1/1978 | Brooks | F04D 9/042 417/199.2 |
| 4,129,503 A * | 12/1978 | Joseph | B01D 29/055 210/232 |
| 4,324,007 A | 4/1982 | Morris | |
| 5,217,044 A * | 6/1993 | Schulte | A01M 7/0085 137/565.17 |
| 6,343,752 B1 | 2/2002 | Sleasman | |
| 7,523,512 B1 | 4/2009 | Delaney | |
| 2002/0174886 A1 | 11/2002 | Paper | |
| 2003/0080055 A1* | 5/2003 | Gross | C02F 3/02 210/620 |

FOREIGN PATENT DOCUMENTS

| | | |
|---|---|---|
| DE | 202012003064 | 7/2012 |
| DE | 202014003274 | 7/2015 |
| DE | 102015106371 | 10/2015 |
| DE | 202015103442 | 10/2016 |
| DE | 202016103149 | 1/2017 |
| DE | 202016102246 | 7/2017 |
| DE | 202016105218 | 12/2017 |
| DE | 202016106367 | 3/2018 |
| DE | 202017101065 | 5/2018 |
| EP | 0628900 | 12/1994 |
| EP | 1728933 | 12/2006 |
| EP | 2850928 | 3/2015 |
| EP | 3133219 | 2/2017 |
| EP | 3375943 | 9/2018 |
| HK | 1215421 | 8/2016 |
| WO | 2012012867 | 2/2012 |
| WO | 2017086858 | 11/2017 |

* cited by examiner

SUCTION DEVICE FOR A WASTEWATER TANK

CROSS REFERENCE TO FOREIGN PRIORITY DOCUMENT

The present application claims the benefit under 35 U.S.C. §§ 119(b), 119(e), 120, 121, 365(c), and/or 386(c) of PCT/EP2017/06081 filed Apr. 27, 2017, which claims priority to German Application DE 202016102246.0 filed Apr. 27, 2016.

FIELD OF THE INVENTION

The present disclosure relates to a sanitary arrangement, in particular a mobile sanitary arrangement in a motor vehicle such as a coach, having a wastewater-collection tank, which has a floor and a side wall, which enclose a tank interior, and also an inlet connection and an outlet device. A further aspect of the present disclosure is a wastewater-collection tank for such a sanitary arrangement and also a retrofittable suction-extraction arrangement for a wastewater-collection tank in such a sanitary arrangement.

BACKGROUND OF THE INVENTION

Wastewater-collection tanks of sanitary arrangements are used for stationary units, for example, water closet ("WC") arrangements for events or construction sites, and for mobile units, such as sanitary arrangements in motor vehicles or track-bound vehicles, and serve to receive the wastewater from toilets, washbasins, or other sanitary arrangements and to collect said wastewater for a certain period of time. Such a wastewater-collection tank has to be emptied at regular intervals. This emptying often takes place by virtue of an emptying valve being opened and of the wastewater being discharged, through a discharge opening, into an appropriate catching device, which is arranged beneath the discharge opening of the wastewater-collection tank.

The advantage with this emptying method is that virtually complete emptying is achieved, resulting in a high level of hygiene in the tank since there is no residual wastewater in the tank. In addition, this emptying method provides for an emptying operation that is very reliable in relation to blockages, which often occurs on account of solids, such as paper towels or the like, in sanitary arrangements, this reliability being achieved as it is possible to realize a large outlet passage at the outlet opening. Such an outlet passage is described in technical terms by means of a ball-passage dimension, that is to say, the diameter of a ball which fits through the outlet passage. Ball-passage dimensions of more than 30 mm or 40 mm are often advantageous in order for the outflow from the outlet opening to take place in a blockage-free manner.

It is known, for example, for coaches to be positioned, for this purpose, above an opening made in the ground, in order for the draining wastewater to pass into said opening. The disadvantage with this procedure is that the coach is sometimes not placed precisely in position, as a result of which the discharge opening does not end up located precisely above the opening in the ground and therefore the region around the opening in the ground is contaminated.

DE 20 2015 103 442 discloses a disposal device for the wastewater tank of coaches, use being made here, instead of such an opening in the ground, of a mobile receptacle that allows improved placement beneath the discharge opening of the wastewater-collection tank. Although, as a result, the positioning accuracy is improved, it is nevertheless the case that the poor visibility can result in incorrect operation, which leads to contamination. In addition, the device already known from DE 20 2015 103 442 U1 requires a catching hopper, which is contaminated by the wastewater being discharged and, therefore, renders subsequent cleaning necessary.

DE 20 2015 105 495 U1 discloses a further development for the disposal of the wastewater from wastewater-collection tanks in coaches. This document proposes using an opening in the ground, said opening being designed in a specific manner and being covered by a specifically shaped grate, to receive the wastewater in a stationary arrangement, and describes various auxiliary means in order to position the discharge opening precisely above said opening in the ground. The technology described therein makes it easier to position the coach and the discharge opening from the wastewater-collection tank installed thereon. Nevertheless, it is also occasionally the case that contamination and odor-related problems occur with this method of emptying the wastewater-collection tank.

DE 89 00 672 U1 discloses a device for draining wastewater-collection tanks in residential areas. This device is designed in a specific manner in order to achieve air-free suction extraction, for which purpose a suction-extraction tube is guided into a container which is arranged in a floating state in the wastewater-collection tank. The disadvantage with this configuration is that the feed of the wastewater from the wastewater-collection tank into the suction-extraction arrangement has to be arranged at a considerable height in relation to the tank floor, in order to ensure that, on account of the hydraulic conditions, the wastewater flows. This means that suction extraction of the wastewater is possible only up to a certain level above the floor, and a considerable amount of residual wastewater remains following suction extraction in the wastewater-collection tank. This may well be functionally acceptable for stationary applications, in which use is made of large wastewater-collection tanks, but it is wholly inadequate for applications in which the available space is at a premium, and, therefore, the full capacity of the wastewater-collection tank has to be utilized, because, in the case of this space-saving application, it has to be possible for suction extraction from the wastewater tank to be as complete as possible.

DE 20 2012 003 064 U1 discloses a wastewater arrangement for camping vehicles, it being possible for the wastewater to be discharged via a discharging nozzle. This discharging nozzle is directed downward, in the center-of-gravity direction, from the floor of the wastewater-collection tank and thus provides for complete emptying of the wastewater-collection tank. The disadvantage with this configuration, however, is that the outflow direction renders a corresponding catching device necessary, and the operation of discharging the wastewater overall can be laborious and unhygienic.

SUMMARY OF THE INVENTION

The present disclosure is based on the object of proposing an improved device for emptying wastewater-collection tanks of sanitary arrangements, in particular, in motor vehicles. The improved device should be suitable, in particular, to meet the specific requirements which arise in vehicles that are equipped with such a sanitary arrangement and, accordingly, a wastewater-collection tank. In particular, account should be taken of the design specifications and the customary production process in vehicle construction. It should be possible for the elements that are necessary for the improved disposal device to be installed in an efficient and cost-effective manner, and reliable operation should be ensured.

This object is achieved according to the present disclosure by a sanitary arrangement that is of the type described in the introduction and in which the outlet device has an outlet opening with a connection coupling for the connection of a suction-extraction arrangement, and also a suction-extraction channel, which, starting from the outlet opening extends downward in the direction of gravitational force to an intake opening within the wastewater-collection tank.

In the case of the outlet device according to the present disclosure, the present disclosure provides a suction-extraction channel which, starting from an outlet opening, extends downward within the wastewater-collection tank to one or more intake openings. The intake opening is, therefore, located in the lower region of the wastewater-collection tank, preferably just slightly above the lowermost point of the wastewater-collection tank, in order for it to be possible for the wastewater-collection tank to be emptied as completely as possible. Contrary to the procedure used in the prior art, in which the wastewater is discharged downward in the direction of gravitational force from the wastewater-collection tank, the present disclosure provides for the wastewater to be extracted by suction from the wastewater-collection tank. For this purpose, a suction-extraction channel is arranged within the wastewater-collection tank, said channel extending from the low-level intake opening to an outlet opening, which can be located above the wastewater-collection tank. This outlet opening has a connection coupling, to which a suction-extraction arrangement can be connected. This connection between the suction-extraction arrangement and the connection coupling is preferably sealed, and, therefore, a negative pressure generated by the suction-extraction arrangement can be introduced into the suction-extraction channel and causes the wastewater to be taken into the intake opening. The outlet opening and the suction-extraction arrangement connected thereto are connected to the intake opening in a fluid-tight manner by the suction-extraction channel.

The device of the present disclosure makes it possible to supply and equip a motor vehicle, such as a coach, with a wastewater-collection tank and to achieve reliable, contamination-free emptying of the wastewater-collection tank. For this purpose, use is made of a suction-extraction arrangement that is connected to a suction-extraction channel. A connection coupling, which is provided for said connection, is connected in a fluid-tight manner by the suction-extraction channel to an intake opening, which is arranged in the wastewater-collection tank, preferably just above the lowermost point of the wastewater-collection tank or at the lowermost point of the wastewater-collection tank. This provides for virtually complete emptying of the wastewater-collection tank without any risk of the surroundings being contaminated.

The sanitary arrangement according to the present disclosure is suitable, in particular, for suction extraction by means of a rotary pump, which on account of its self-priming properties achieves complete emptying even when air is taken in.

An embodiment according to the present disclosure makes it possible to use wastewater-collection tanks of different configurations. It is possible, in principle, for the floor of such a wastewater-collection tank to be designed in the form of a planar floor surface, but also as an irregularly structured floor surface with various floor-wall portions at different heights. It is also possible for the sidewall or sidewalls to be of different designs. For example, not only is it possible to have cylindrical configurations with a single sidewall designed in the form of a cylinder wall, but it is also possible to have angular, rounded-angle, or otherwise indented sidewall structures. It is also possible for the upper side of the wastewater-collection tank to be designed with a planar surface or a plurality of planar or oblique surfaces to coincide with the geometrical freedom of design of the floor wall of the wastewater-collection tank. Overall, the embodiment according to the invention provides for an indented geometrical structure of the wastewater-collection tank, the only precondition being that it has to be possible to install the suction-extraction channel, which extends, at least in part, through the wastewater-collection tank and reaches preferably to the lowermost point of the wastewater-collection tank.

The intake opening may be delimited by an upper edge which is spaced apart from the tank floor by a distance which is smaller than 10% of the overall height of the wastewater-collection tank. This embodiment makes it possible to empty up to at least 90% of the wastewater-collection tank if the wastewater-collection tank has an essentially uniform cross-sectional geometry. In particular, it is preferred if the edge which delimits the intake opening at the top is located above the tank floor by a distance of less than 5% of the overall height of the wastewater-collection tank. For example, it is possible for the edge to be arranged above the tank floor by a distance of less than 5 cm or less than 2 cm, preferably by a distance of less than 1 cm, and, therefore, the wastewater-collection tank can be emptied more or less completely by suction extraction.

The intake opening may be formed on a suction bell, of which the dimensioning parallel to the plane of the tank floor is greater than the cross section of the suction-extraction channel. A suction bell here is intended to mean, in particular, a dome-like structure that is widened in relation to the suction-extraction channel, is arranged at the lower end of the suction-extraction channel, and has its horizontal dimensioning greater than the horizontal dimensioning of the suction-extraction channel. The suction bell contains one or more intake openings which, as a result of the greater horizontal dimensioning, provides for more favorable suction extraction of the wastewater, and solids contained therein, from the wastewater-collection tank. In particular, such a suction bell can generate a suction-and-vortexing action which gives rise to blockage-free suction extraction of the wastewater from the wastewater-collection tank. In the prior art it is often necessary for a wastewater-collection tank in a coach to be capable of being completely emptied just by a double emptying operation, the wastewater tank being filled, between the two parts of the double emptying operation, with for example fresh water and the coach moving a certain distance in order for the contents of the wastewater-collection tank to be thoroughly mixed. This can usually be avoided by suction extraction using a suction bell, the latter achieving complete emptying in a single emptying operation.

The suction bell may be arranged eccentrically in relation to a longitudinal axis of the suction-extraction channel. An eccentric arrangement of the suction bell can significantly facilitate the installation of the suction bell together with the suction-extraction channel since it is easier, with this eccentric design, for the combined component comprised of the suction bell and suction-extraction channel to be introduced through a small opening in the upper side of the wastewater-collection tank. In particular, this is facilitated and made possible in that the entire unit, in the first instance, can be inclined, in order for the suction bell to be introduced, and then the suction-extraction channel can be pushed into the wastewater-collection tank with a vertical, rectilinear movement and orientation. An eccentric arrangement here is intended to mean that the center point of the volume of the suction bell or the center point of a cross-sectional surface area of the suction bell is offset laterally in relation to the center axis of the suction-extraction channel. If the suction-extraction channel and suction bell are designed in the form of cross-sectionally circular structures, the center axis of the suction bell is offset laterally in relation to the center axis of the suction-extraction channel. In other designs, for example, polygonal designs, of the suction bell and/or of the suction-extraction channel, the eccentric position can be understood in relation to the center points of the cross-sectional surface areas.

Further, provision may be made for the suction bell to be a foldable design and to be capable of deployment from a folded-in state, in which it has a first circumference in a direction transverse to the longitudinal extent of the suction-extraction channel into a folded-out state, and in which it has a second circumference in a direction transverse to the longitudinal extent of the suction-extraction channel, said second circumference being greater than the first circumference. Such a foldable configuration facilitates the installation of the suction bell within the wastewater-collection tank to an even greater extent. Folding capability of the suction bell here is intended to mean that the suction bell can be deployed from a folded-in state with compact outer dimensions into a folded-out state with outer dimensions which are greater than those in the folded-in state. In principle, it is necessary for this deployment operation to be possible just once and, if appropriate, for the suction bell to latch in in the deployed position, so that this deployed position is ensured for the duration of operation. Deployment can be realized here by means of elastic deformation of the suction bell or can take place by way of a mechanical structure, for example, in the manner of an expanding lattice or of a rod-assembly structure, such as in umbrellas, that is to say, by means of different levers that are connected to one another by joints. As an alternative, or in addition, it is possible for shape-memory metals to stabilize the structure of the suction bell and to fold over from a folded-in state into a folded-out state. Deployment of the suction bell from a folded-in state into a folded-out state is also intended to mean, according to the invention, an embodiment in which the suction bell is deployed by virtue of a mechanically stabilizing framework being pumped up by a medium under pressure, for example, liquid or air. In particular, it is possible for deployment to be achieved by virtue of a stabilizing framework of the suction bell being pumped up.

The connection coupling may be arranged above an angled portion of the suction-extraction channel, wherein preferably the angled portion is angled, starting from a through-passage direction in the region of the connection coupling, from 0° to 75°, in particular 45°, to the horizontal to a through-passage direction of 75° to 105°, preferably 90° to the horizontal in the region of the suction-extraction channel. In principle, the device of the present disclosure can be realized by the suction-extraction channel extending essentially vertically within the wastewater-collection tank and running linearly in the upper region, in particular, in a region of the suction-extraction channel which extends outside the wastewater-collection tank, and providing for the connection of the suction-extraction arrangement to the connection coupling by a vertical connection method. For certain installation positions, however, it may be advantageous if the connection coupling is not located horizontally, that is to say, rather than the outlet opening having a horizontally located cross-sectional surface area, the cross-sectional surface area of the outlet opening, and, therefore, of the connection coupling, is inclined in relation to the horizontal. Depending on the installation situation of the wastewater-collection tank and of the suction-extraction channel, the extent of said inclination may differ. In particular, it is advantageous for many installation situations and many connection situations, if the connection coupling is located at an angle of 45°, and, therefore, as a result, the cross-sectional surface area of the outlet opening in the region of the connection coupling is inclined by 45° in relation to the horizontal. This provides for reliable, contamination-free connection of the suction-extraction arrangement, and, in addition, contamination-free return of residual wastewater into the wastewater-collection tank when the suction-extraction arrangement is uncoupled.

The connection coupling may be a bayonet coupling or a screw-connection coupling. It is possible here for the connection coupling to be locked in a known manner by means of a union nut, which is arranged on the connection coupling and interacts with a corresponding external thread on the connection hose of the suction-extraction arrangement, or vice versa. It is particularly preferred, however, to provide a bayonet coupling, which uses a rotary movement over a small angle range, a pushing movement, or a combined rotary/pushing movement to arrest the connection between a suction-extraction hose of the suction-extraction arrangement and the connection coupling securely. For example, a coupling known as a camlock fitting can be used for this configuration.

The connection coupling may be designed in the form of a female coupling part and, consequently, is designed for coupling to a male coupling part, which is present on a suction-extraction hose or a suction-extraction tube of a suction-extraction arrangement. This achieves as far as possible drip-free coupling and uncoupling since it is possible for wastewater residues which drip out of the downwardly inclined male coupling part during coupling or uncoupling to be caught in the female coupling part and thus to run back into the wastewater-collection tank.

The coach according to the present disclosure may be developed in that the one or more intake openings are formed by apertures of which the through-passage cross section is delimited by the floor of the wastewater-collection tank and by an intake-opening periphery. The intake-opening periphery may be connected to a moveable negative-pressure surface and is retained in a first, lowered position by means of prestressing, and, therefore, the intake opening, in the first position, in which a first negative suction pressure in the suction-extraction channel acts on the negative-pressure surface, is arranged at a first distance from the tank floor and, in a second position, in which a second negative suction pressure in the suction-extraction channel acts on the negative-pressure surface, said second negative suction pressure being higher than the first negative suction pressure, is arranged at a second distance from the tank floor, said second distance being greater than the first distance, in that the second negative suction pressure acting on the negative-pressure surface subjects the intake-opening periphery to a lifting force, which acts counter to the prestressing, and, as a result of raising the intake-opening periphery, causes the through-passage cross-section of the intake opening to be increased.

A general problem with the suction extraction of wastewater from a wastewater-collection tank is that, on the one hand, the wastewater-collection tank should be emptied as completely as possible and, on the other hand, blockages of the wastewater suction-extraction system should be prevented. For complete emptying, it is necessary for the suction-extraction opening to be small and arranged as closely as possible to the lowermost point, that is to say, typically to the floor of the wastewater-collection tank. Such an arrangement, however, often results in the intake opening being narrowed, that is to say, having just a small cross section, which blocks easily.

The present disclosure, therefore, provides, according to this embodiment, for the intake opening to be delimited by an intake-opening periphery and by the tank floor. The intake-opening periphery delimits the intake opening at the top and preferably also laterally, whereas, the tank floor delimits the intake opening at the bottom. It is possible here to provide a single intake opening, but also equally a plurality of intake openings, which are then delimited by respectively dedicated intake-opening peripheries.

The intake-opening periphery can be formed, for example, on a suction bell, such as a suction bell described above, or directly on the suction-extraction channel or a component fastened at the bottom thereof. The intake opening may be arranged in a prestressed position just above the floor of the wastewater-collection tank and thus provides for virtually complete emptying of the wastewater-collection tank, since air is taken in only when the filling level is very low and the negative suction-extraction pressure breaks down at this point. If, however, a solid body results in said intake opening or openings blocking, then the negative pressure in the suction-extraction channel increases as a result of this blockage. The intake opening is coupled to a negative-pressure surface, which is subjected to the action of said negative pressure. An increased negative pressure acts counter to the prestressing which retains the intake-opening periphery in a prestressed state in the lowered position, and said increased negative pressure partially or completely eliminates this prestressing. The action of the increased negative pressure, therefore, results in the intake-opening periphery being raised and, consequently, in the through-passage cross section of the intake opening being increased. This increase allows the blockage to dissipate and/or also a relatively large foreign body to be sucked into the suction-extraction channel and thus to be removed from the wastewater-collection tank. As soon as the blockage is eliminated, the negative suction-extraction pressure in the suction-extraction channel drops back again to a lower level and the intake-opening periphery descends again into the original position, in which the wastewater collection tank can be emptied more or less completely.

It should be understood that the increase in the through-passage cross section of the intake opening(s) is one effect, but not necessarily the only effect; rather, another function is performed in addition, or also as an alternative. If the intake-opening periphery raises up, just the resulting movement can dissipate a blockage, even when the raising action does not give rise to any, or any significant, increase in the cross section of the intake openings. It is also possible, in particular when final residues are being extracted by suction from the wastewater-collection tank, for the raising action to lead to air being taken in, which results in the negative suction-extraction pressure immediately breaking down, or being reduced to a considerable extent, and consequently allows the intake-opening periphery to return quickly again into the lowered position. This can result in the intake-opening periphery moving up and down a number of times, which is likewise helpful in breaking up blockages.

The intake-opening periphery may swing away in the suction-extraction direction, that is to say, in the direction in which the wastewater passes through the intake openings, and may be raised as a result. It is possible for the intake-opening periphery to be spaced apart from the suction-extraction channel by such a distance that the through-passage cross section in the suction-extraction channel is not restricted when the intake-opening periphery swings inward.

In particular, the ball-passage dimension may be of at least 30 mm, preferably at least 40 mm, produced as a result of the intake-opening periphery being raised with a ball-passage dimension also being maintained in the suction-extraction channel.

During reversed flow, that is to say, during filling of the wastewater-collection tank through the suction-extraction channel and outflow through the intake opening, the intake-opening periphery likewise moves, in particular, descends or swings outward and, as a result, the cross section of the intake opening decreases and/or the outflow direction thereof changes. This serves to generate an effective, sharp cleaning jet, which exits into the wastewater-collection tank from the suction-extraction channel, through the intake openings, and thus dissipates blockages and breaks up solids deposited on the tank floor. It is thus possible, for example, for the suction-extraction operation to be carried out such that the flow is reversed for a short period of time on an intermittent basis, for example, at regular intervals or, in particular, when blockages occur.

Finally, the embodiment can be used in order to realize different suction-extraction methods, for example, suction extraction can be achieved at high negative pressure, which results in the intake-opening periphery raising up and, consequently, it is also possible to provide a large through-passage cross section through the intake opening(s) and/or the follow-on flow of liquid from the wastewater-collection tank is facilitated, and, therefore, the risk of air being taken in through the intake openings is reduced. If, in contrast, suction-extraction work is carried out at a relatively low negative pressure, then the intake-opening periphery remains in the lowered position and a favorable vortexing effect is achieved in the vicinity of the floor of the wastewater-collection tank, which provides for complete suction-extraction of a sediment from the wastewater-collection tank.

The intake-opening periphery and the negative-pressure surface may be connected in one piece to the suction-extraction channel and the intake-opening periphery is raised as a result of elastic properties. The intake-opening periphery and the negative-pressure surface can be formed from an elastomer, for example, a polyurethane (PU), in particular, a thermoplastic PU (TPU), or a nitrile butadiene rubber (NBR). The suction-extraction channel, the intake-opening periphery, and the negative-pressure surface are preferably formed from a corresponding material, and the wall thickness of the suction-extraction channel is provided by full or partial wall-thickness dimensioning (ribbing) such that the increased negative suction-extraction pressure, which results in the intake-opening periphery being raised, does not cause the suction-extraction channel to be constricted. As an alternative to such wall-thickness dimensioning using the same kind of material, it is also possible for the suction-extraction channel and intake-opening periphery and the negative-pressure surface to be formed from different materials, for example, by means of a coextrusion production process.

In principle, within the context of this description and of the claims, a high negative pressure is intended to mean a strong vacuum or a strong negative pressure, and a negative pressure that is lower in comparison is intended to mean a lower or weaker vacuum.

Finally, provision is made, according to a further embodiment, for the intake-opening periphery, which delimits the intake opening, and the negative-pressure surface to be formed in one piece on the suction bell. This embodiment particularly advantageously provides for robust production and the realization of the functionally sought-after increase in the cross sections of the intake openings or of a single intake opening, in order thus to make it possible for a blockage to be easily broken up by virtue of the intake-opening periphery being raised. For this purpose, the intake opening can be configured, for example, in the form of a lower aperture in a sidewall of the suction bell. This consequently results in the formation, on the underside, in the sidewall, of a short channel, which, therefore, defines a radial opening of which the through-passage cross section is increased by virtue of the plate being raised.

According to an alternative configuration, the one or more intake opening(s) can be formed by apertures in a plate that is fastened in a movable manner on a membrane and is retained by means of prestressing such that in a first position, in which a first negative suction pressure prevails in the suction-extraction channel, the plate is arranged at a first distance from the tank floor, and in a second position, in which a second negative suction pressure prevails in the suction-extraction channel, the said second negative suction pressure being higher than the first negative suction pressure, the plate is arranged at a second distance from the tank floor, said second distance being greater than the first distance, in that the second negative suction pressure acting on the membrane subjects the plate to a lifting force, which acts counter to the prestressing.

A further aspect of the present disclosure is constituted by a wastewater-collection tank for a motor vehicle, in particular a coach, having a sanitary arrangement installed therein, comprising a floor and a sidewall, which enclose a tank interior, an inlet connection, and an outlet device, in the case of which the outlet device has an outlet opening with a connection coupling for the connection of a suction-extraction arrangement, and also a suction-extraction channel, which, starting from the outlet opening, extends downward in the direction of gravitational force to an intake opening within the wastewater-collection tank. The wastewater-collection tank is suitable for installation in a coach, in order thus to provide for suction extraction from the wastewater-collection tank using a suitable suction-extraction arrangement.

It should be understood here that the wastewater-collection tank can be developed, in particular, in the same way as has been described previously for the motor vehicle with a corresponding wastewater-collection tank. As far as the variants, functions, and advantages achieved here are concerned, reference is made to the description above.

Yet a further aspect of the present disclosure is constituted by a retrofittable suction-extraction arrangement for a wastewater-collection tank of a sanitary arrangement, in particular, in a vehicle such as a coach, having a sanitary arrangement installed therein, comprising an inlet connection and an outlet device, in the case of which the outlet device has an outlet opening with a connection coupling for the connection of a suction-extraction arrangement, and also a suction-extraction channel, which, starting from the outlet opening, extends downward in the direction of gravitational force to an intake opening within the wastewater-collection tank. Such a retrofittable suction-extraction arrangement is suitable for installing in existing wastewater-collection tanks in motor vehicles, such as coaches, a device which provides for the suction extraction of the wastewater. It should be understood here that the retrofittable suction-extraction arrangement is installed permanently in or on the wastewater-collection tank of the coach and, for the necessary suction extraction of the wastewater, is connected to a corresponding suction-extraction arrangement and then provides for the appropriate channeling of the wastewater from the wastewater-collection tank to the suction-extraction arrangement. Like the wastewater-collection tank described above, the retrofittable suction-extraction arrangement can be developed as has been explained above for the motor vehicle with corresponding wastewater-collection tank. As far as the possible variations, advantages, and functions in this respect are concerned, reference is made, once again, to the description above.

Finally, yet a further aspect of the present disclosure is constituted by a method for emptying a wastewater collection tank of a sanitary arrangement, in particular, in a vehicle such as a coach having a sanitary arrangement installed therein, the method having the following steps: arranging an intake opening within the wastewater-collection tank above a tank floor, connecting a suction-extraction arrangement to an outlet opening using a connection coupling, and extracting wastewater by suction from the wastewater-collection tank through a suction-extraction channel, which connects the outlet opening to the intake opening and, starting from the outlet opening, extends downward in the direction of gravitational force to the intake opening.

The method can be developed in that the intake opening is spaced apart from the tank floor by a distance that is smaller than 10% of the overall height of the wastewater-collection tank and is installed in a fixed state at this height.

The method can be developed yet further in that the one or more intake openings is or are delimited by the tank floor and by an intake-opening periphery, which is connected to a negative-pressure surface that is subjected to a negative suction pressure in the suction-extraction channel, and, therefore, the intake-opening periphery, at a first negative suction pressure in the suction-extraction channel, is retained by means of prestressing in a first position, in which the intake-opening periphery is arranged at a first distance from the tank floor, and, at a second negative suction pressure in the suction-extraction channel, said second negative suction pressure being higher than the first negative suction pressure, the negative-pressure surface subjects the intake-opening periphery to a lifting force, which acts counter to the prestressing, and, therefore, at the second negative suction pressure, the intake-opening periphery is moved into a second position, in which the intake-opening periphery is arranged at a second distance from the tank floor, said second distance being greater than the first distance.

The method can be developed yet further in that the intake-opening periphery is raised from the first position into the second position by part of a wall which delimits the suction bell deforming. As far as the functions, advantages, and possible variations of the method thus described are concerned, reference is made to the corresponding features of the coach or motor vehicle described above.

Finally, it is further preferred if the suction-extraction operation is reversed when a blockage occurs or at regular intervals, and in the process liquid, in particular, wastewater, is introduced into the wastewater-collection tank from the intake openings and, during this reversed flow, the intake-opening periphery moves, in particular, descends, and thus reduces the through-passage cross section of the intake openings.

BRIEF DESCRIPTION OF THE DRAWINGS

Preferred embodiments of the invention will be explained with reference to the figures, in which.

DETAILED DESCRIPTION OF THE PREFERRED EMBODIMENTS

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
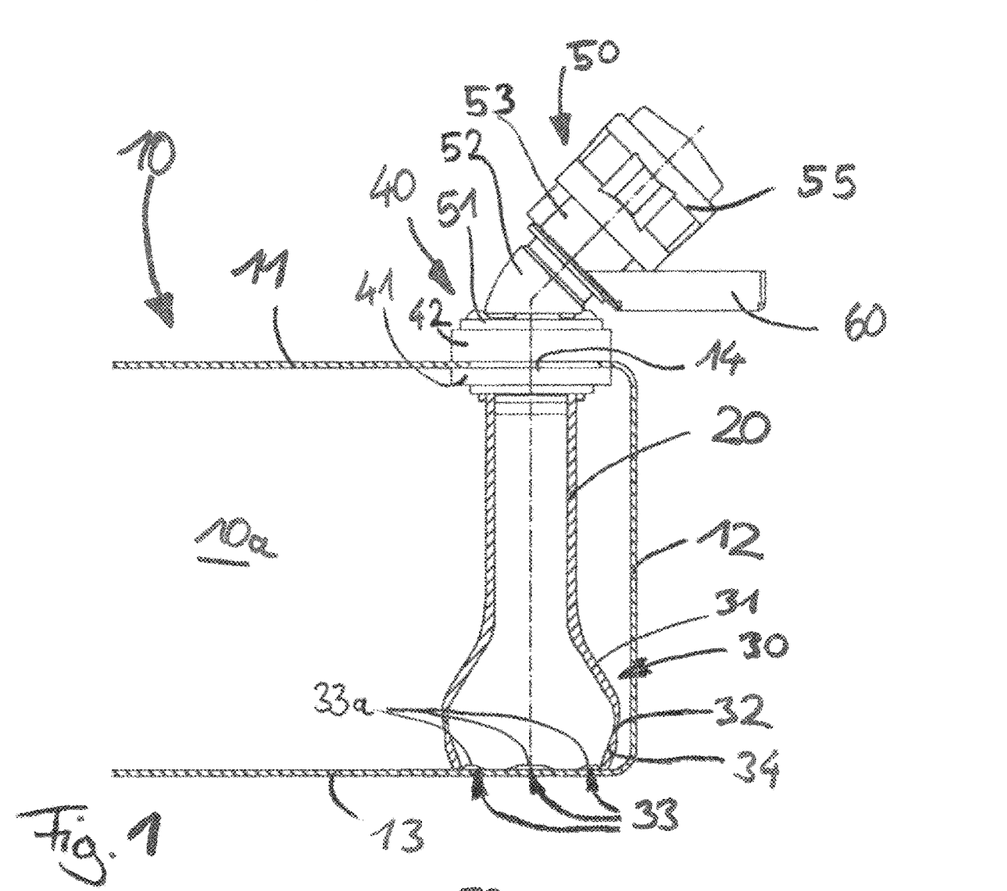
FIG. 1 is a first embodiment of the invention including a partially sectional side view of part of a wastewater-collection tank with a suction-extraction connection installed.
Figure 1A:
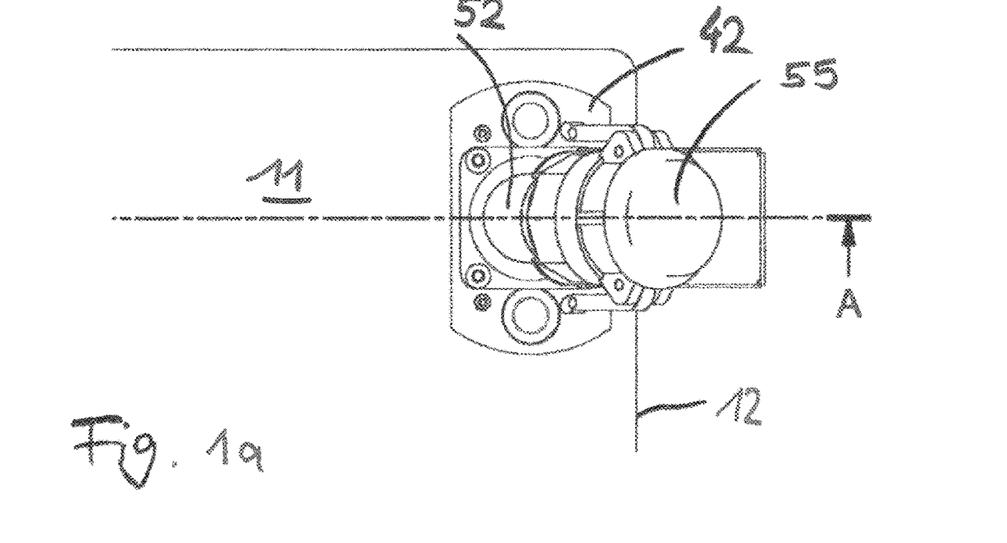
FIG. 1a is a plan view of the embodiment shown in FIG. 1.
Figure 2:
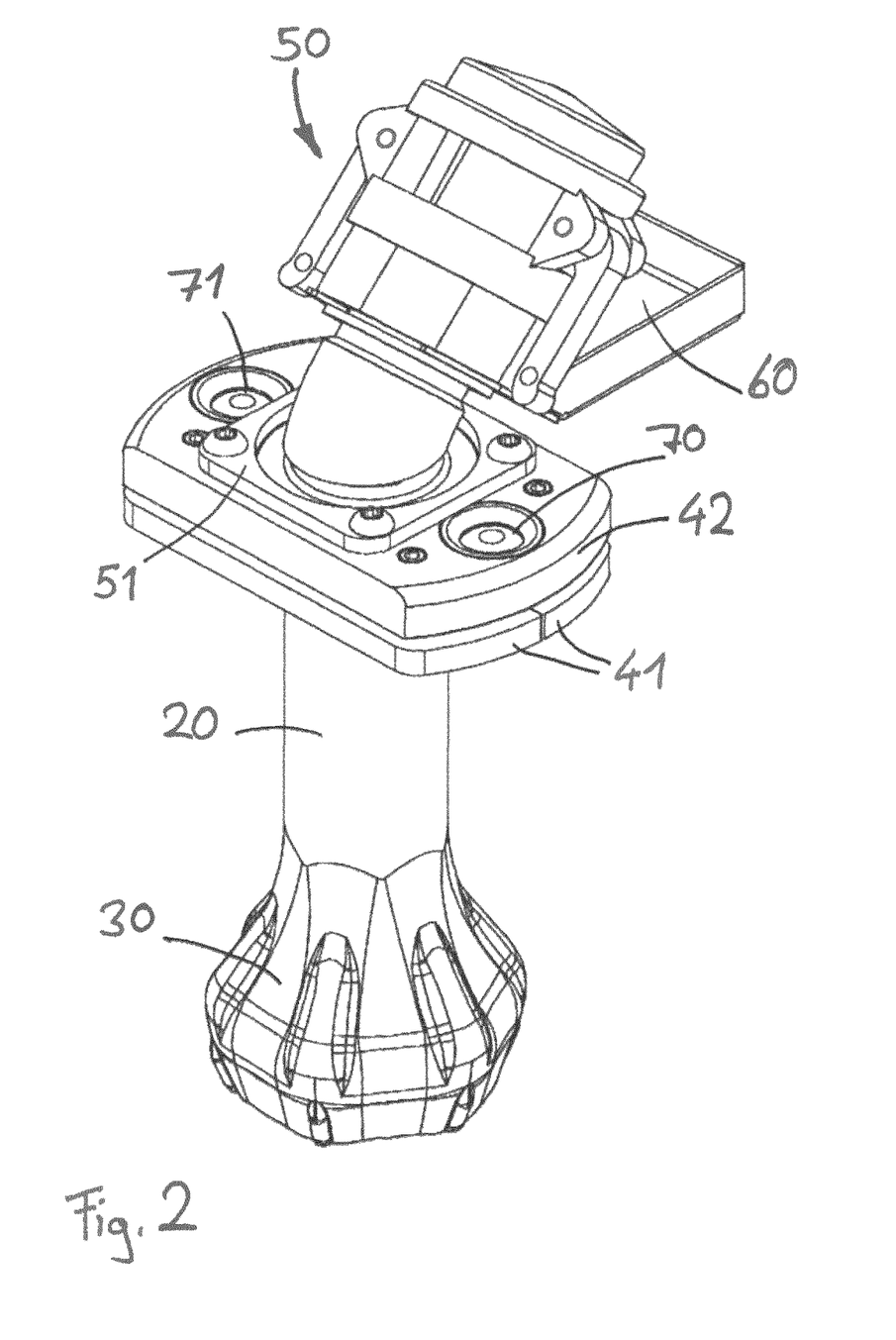
FIG. 2 is a perspective view of the embodiment according to FIG. 1.
Figure 3:
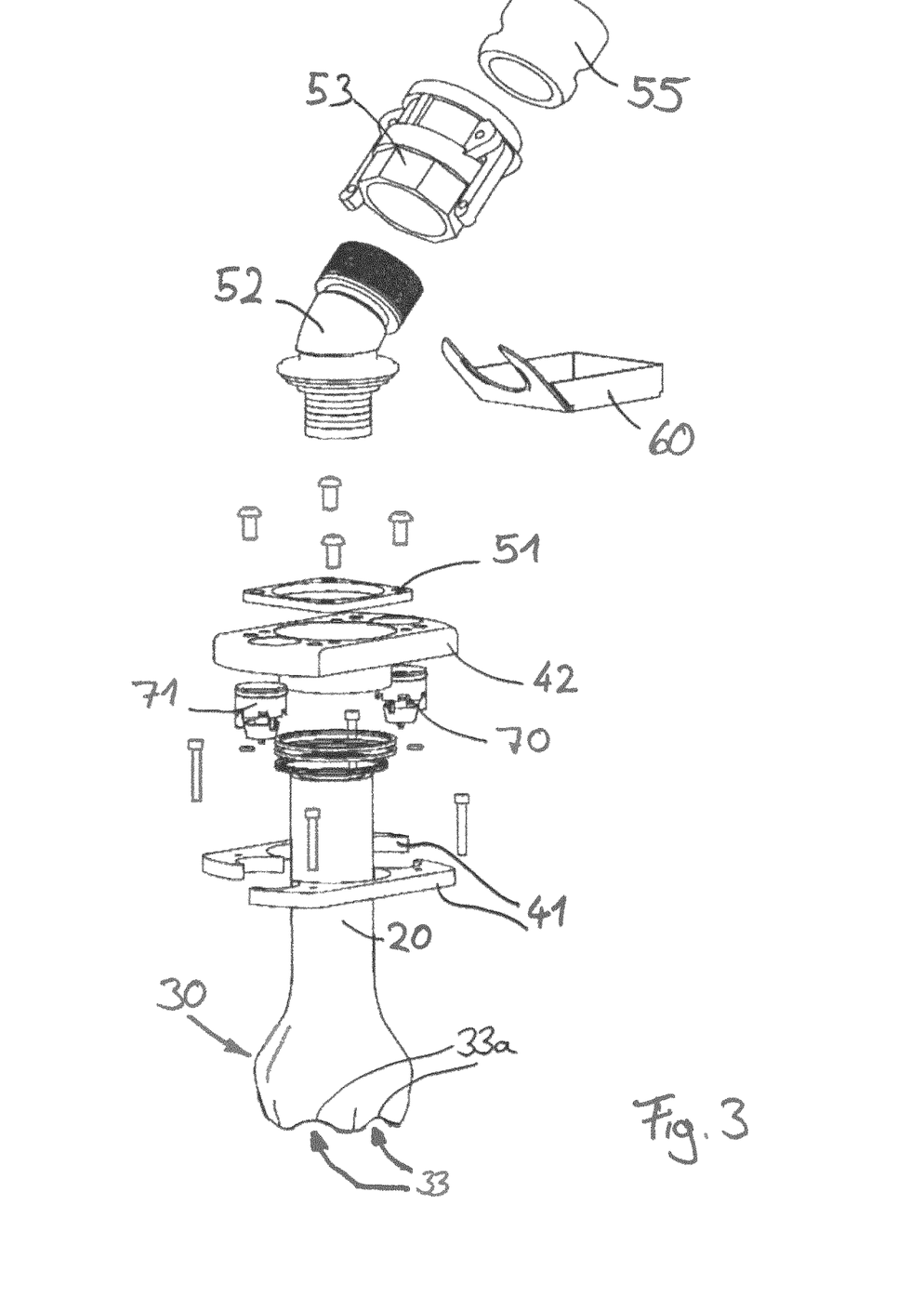
FIG. 3 is an exploded illustration, in perspective, of the embodiment according to FIG. 1.

Looking first of all at FIGS. 1-3, the latter shows a wastewater-collection tank 10 comprising a tank interior 10a, which is delimited on the upper side by an upper wall 11, laterally by a sidewall 12 and on the floor side by a floor 13. The wastewater-collection tank 10 is designed with rounded edges. An opening 14 in the upper wall 11 is made directly in the peripheral region of the upper wall 11, it being possible for a fixed-installation suction-extraction channel 20 to be introduced through said opening 14 and to be fastened in the region around the opening 14.

The suction-extraction channel 20 extends vertically downward from the upper wall 11 to a suction bell 30. The suction-extraction channel 20 is preferably provided such that it can be cut to length at its upper end to a dimension appropriate to be used for wastewater-collection tanks of different installation heights. For this purpose, the installer proceeds such that the installer introduces the suction-extraction channel 20 together with the suction bell 30 into the wastewater-collection tank 10 and positions the same on the floor 13 of the wastewater-collection tank 10. The prefabricated suction-extraction channel 20 here is at such a length that it projects upwards out of the wastewater-collection tank 10, through the opening 14, and can then be cut flush with the upper wall 11. This flush-cut portion can then be used for installation purposes, as will be explained in more detail hereinbelow.

The suction-extraction channel 20 and the suction bell 30 are formed in one piece and can be made from a single material or a single material composite. In principle, however, it is also possible for certain portions of the suction bell 30 and/or suction-extraction channel 20 to be formed from different materials and for this composite arrangement to be made into a single piece, i.e., integral, for example by extrusion, injection molding, or adhesive bonding.

The suction bell 30 may have a conically downwardly widening wall portion 31 which, starting from the suction-extraction channel 20, widens downward to a larger cross section of the suction bell 30 and thus produces a cross-sectional surface area in the region of the suction bell 30 that is larger than the suction-extraction channel 20. This conically widening wall portion 31 is adjoined in the downward direction by an approximately vertical folding-wall portion 32, which has a reduced wall thickness in relation to the wall portion 31. This folding-wall portion 32, in turn, is adjoined at the bottom by a wall portion 34, which tapers conically slightly in the inward direction and extends to the floor 13 of the wastewater-collection tank 10. This lower wall portion 34 has a plurality of apertures 33, and, therefore, the wall portion 34 stands on the floor wall 13 only by way of a few supporting portions 35 and wastewater can be sucked into the suction bell 30 from the interior 10a through the apertures 33. The intake openings are delimited at the upper periphery by intake-opening peripheries 33a, which are located a short distance away from the tank floor 13. As a result, wastewater is taken in in the very close vicinity to the floor 13, which results in very advantageous vortexing in the vicinity of the floor 13 during the suction-extraction operation, solids and sediments that are deposited on the floor wall 13 being mixed up, and sucked in, as a result.

The folding-wall portion 32 acts like a film hinge. In normal suction-extraction-pressure conditions, i.e., when wastewater is being sucked into the suction bell 30 through the apertures 33, this suction-extraction operation takes place with the suction bell 30 in the configuration illustrated in FIG. 1. If one or more of the apertures 33 is or are blocked by solids, for example, paper towels, this results in an increase in the suction pressure in the interior of the suction bell 30. This increase causes the lower wall portion 34 to be subjected to an inwardly directed force, and, therefore, said wall portion 34 can swing inwards in the region of the folding-wall portion 32. This swinging-in action raises the intake-opening peripheries 33a relative to the floor wall 13 and this results, briefly, in a larger through-passage cross section through the apertures 33, through which such solids can be sucked into the suction bell 30. This eliminates the blockage effect, the suction pressure drops again to normal values, and the suction bell 30 moves back into the configuration shown in FIG. 1 as a result of elastic restoring forces within the material of the wall portions 31, 32, and 34.

The upper end of the suction channel 20 has an installation flange 40, by means of which the suction channel 20 is fastened on the upper wall 11. The fastening flange 40 comprises a lower fastening-flange plate 41 and an upper fastening-flange plate 42, between which a wall region can be clamped in around the opening 14. The suction channel 20 is fastened rigidly on the lower fastening-flange plate 41 and is thus installed in a fixed state, in the orientation shown in FIG. 1, within the wastewater-collection tank 10.

A connection-flange plate 51, which accommodates in a rotatable manner a connection tube 52 that is angled through 45°, is fastened on the upper fastening-flange plate 42. The connection tube 52 is fastened for rotation about a vertical axis, and, therefore, a connection coupling 50 connected to said connection tube 52 can be pivoted about the vertical axis, in order thus to provide straightforward and easily accessible connection for a suction-extraction hose (not shown).

The connection coupling 50 comprises a connection flange 53 on which a catch basin 60 is fastened in a removable manner, it being possible for wastewater that drips off during coupling or uncoupling to be caught in said catch basin.

The connection flange 53 is closed by means of a closure cap 55. The closure cap 55 is fastened on the connection flange 53 by a camlock system. As soon as a suction-extraction operation is to be carried out, this camlock locking is released, the closure cap 55 is removed, and a suction-extraction hose or a suction-extraction tube is coupled to the connection flange 53 in a fluid-tight manner by means of a corresponding camlock connection.

The suction-extraction device according to the invention also has one or more nonreturn valves that connect the tank interior to the surroundings. These nonreturn valves are designed to open when a predetermined negative pressure is exceeded, and thus to provide for pressure equalization between the surroundings and the tank interior. These nonreturn valves serve to prevent the build-up of excessive negative pressure during a suction-extraction operation in the wastewater-collection tank 10, therefore avoiding deformation of, or damage to, the wastewater-collection tank 10. In the case of the embodiment illustrated in FIGS. 1-3, two nonreturn valves 70, 71 have been inserted into the upper fastening-flange plate 42 and extend through the upper and the lower fastening-flange plates 42, 41, in order thus to establish a connection between the surroundings and tank interior.

Figure 4:
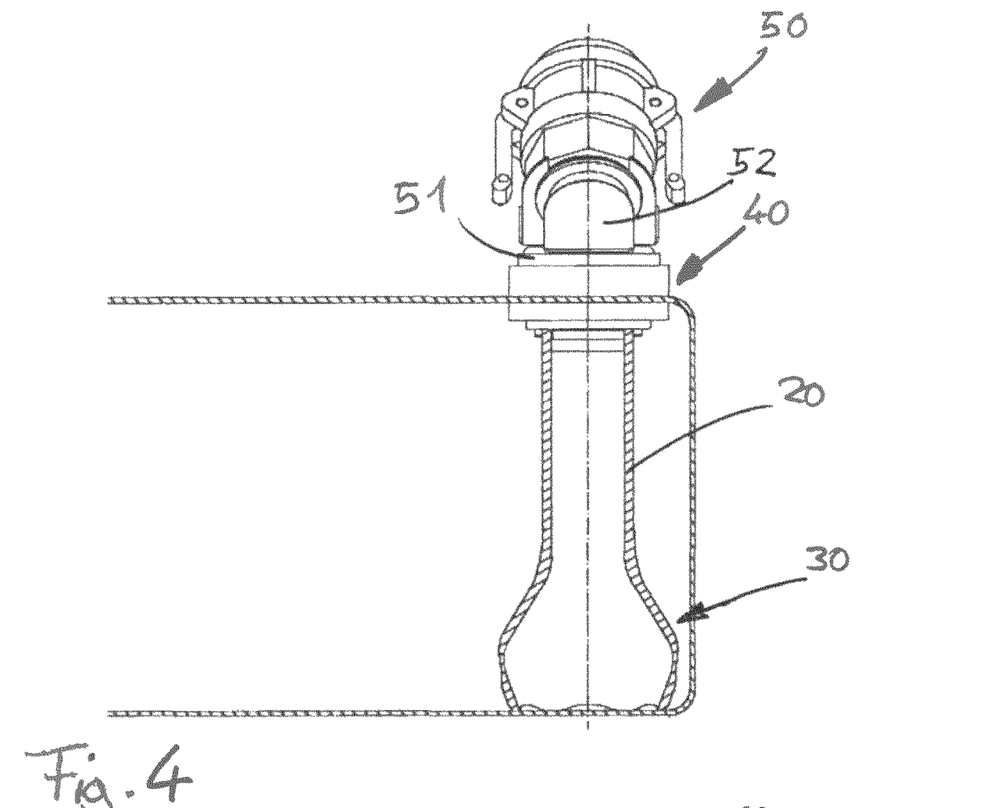
FIG. 4 is a view according to FIG. 1 of the embodiment according to FIG. 1 with the connection nozzle rotated.
Figure 4A:
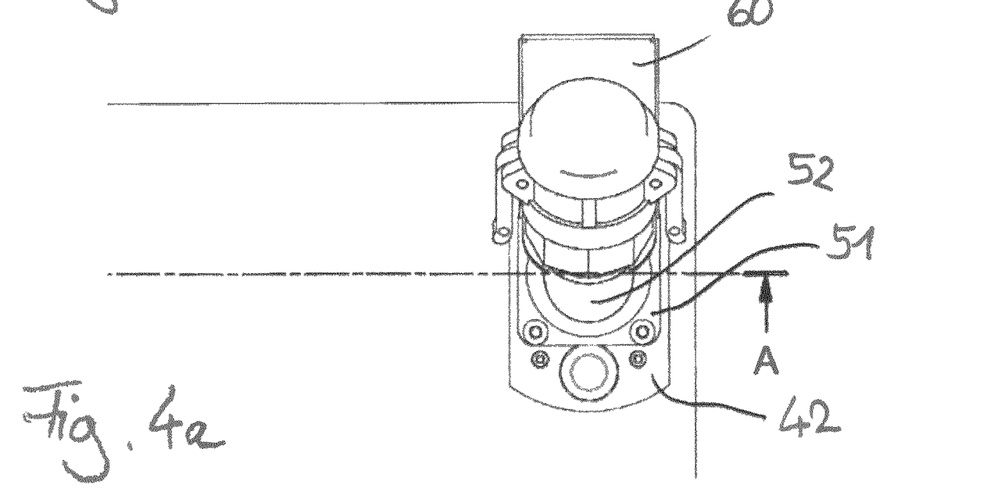
FIG. 4a is a plan view of the embodiment according to FIG. 2.

FIGS. 4 and 4a show a sectional side view and a plan view of the embodiment according to FIG. 1 with a connection coupling 50 rotated in relation to the orientation shown in FIG. 1. As illustrated, the connection coupling 50 has been rotated through 90° about the vertical axis as a result of the angled connection tube 52 being rotated in relation to the connection-flange plate 51, which allows a suction-extraction hose or a suction-extraction tube to be installed from a different direction. It should be understood that this pivoting capability of the connection coupling 50 can also be realized for all the embodiments which will be explained herein below, and the connection-flange plates and angled connecting tube used in these following embodiments can be pivoted in relation to one another in the same way.

Figure 5:
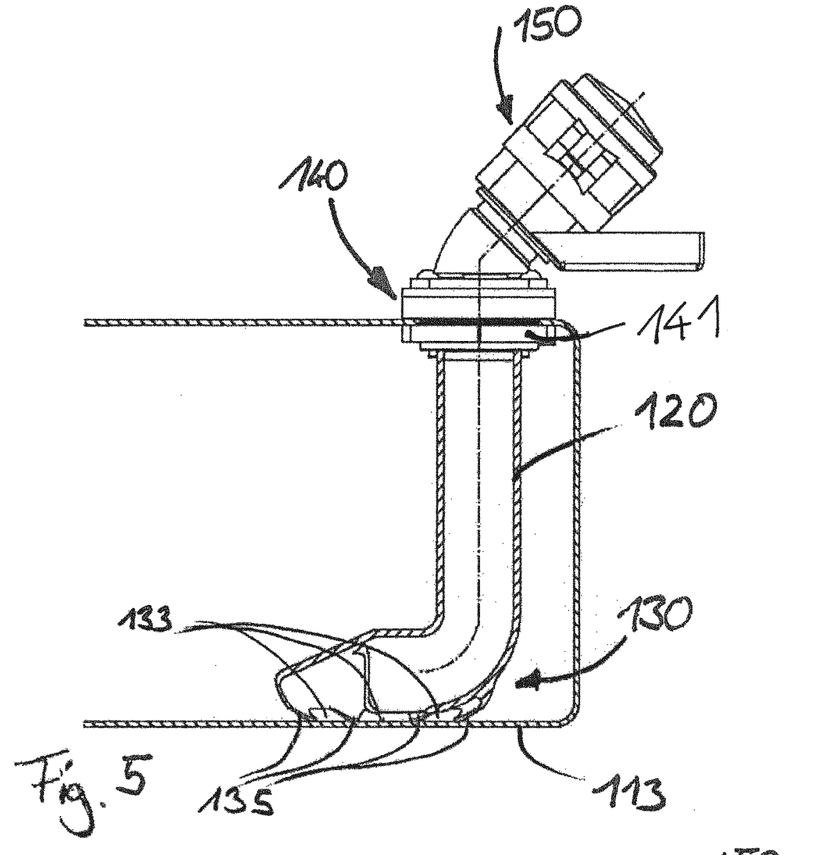
FIG. 5 is a second embodiment of the invention in a view according to FIG. 1.
Figure 5A:
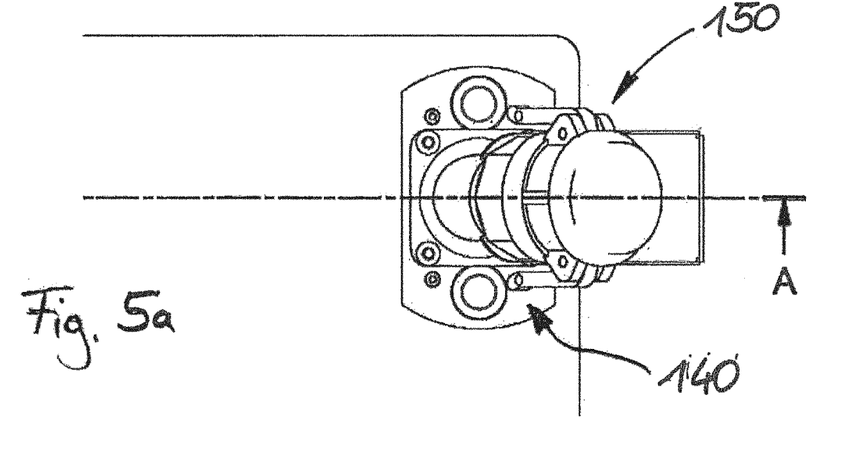
FIG. 5a is a plan view of the embodiment according to FIG. 5.

FIGS. 5 and 5a show a second embodiment of the invention. In the case of this embodiment, the entire upper part, including the connection coupling 150 located outside the tank and the method of connection to the tank by means of a connection flange 140, is structurally identical to the first-embodiment flange connection 40 and connection coupling 50 explained above.

It is also the case with the second embodiment that a suction tube 120 extends downward within the wastewater-collection tank 10, starting from a lower flange-connection plate 141, and is formed in one piece with a suction bell 130.

It is likewise the case that the suction bell 130 is seated on the floor, but in contrast to the suction bell 30 of the first embodiment, which is designed concentrically and in a rotationally symmetrical manner in relation to the suction tube 20, suction bell 130 is designed eccentrically and in a rotationally non-symmetrical manner. Instead, the suction bell 130 terminates flush with a sidewall portion of the suction tube 120 and extends horizontally only over approximately 270°, in such a manner that its cross section exceeds the cross section of the suction tube. The suction bell 130 may be of semicircular or circular cross section, although other geometries, including mixtures of these or polygonal configurations, are also possible.

It is likewise the case that the suction bell 130 rests on the floor wall 113, and, in this case, is retained in a propped-up state by a plurality of feet 135. The feet 135 delimit suction-extraction openings 133, which are each formed between said feet 135 and are delimited by the walls of the feet 135. The feet 135 themselves are elastically deformable and have a wall portion that is oriented inwards in the direction of the suction bell 130 and is subjected to the action of the negative pressure acting in the suction bell 130. If this negative suction pressure increases as a result of blocking the intake openings 133, then these feet 135 swing inwards and, as a result, increase the through-passage cross section of the intake openings 133. This also make it possible for a solid, which has caused the blockage-related increase in negative suction pressure, to be sucked into the suction bell 130. Once the solid has been sucked in and the negative suction pressure has correspondingly dropped, the feet 135 swing once again into the elastically prestressed position, as shown in FIG. 5. This, therefore, provides the conditions, once again, for suction extraction of the wastewater in the vicinity of the floor, along with corresponding vortexing in the vicinity of the floor and cleaning action.

Figure 6:
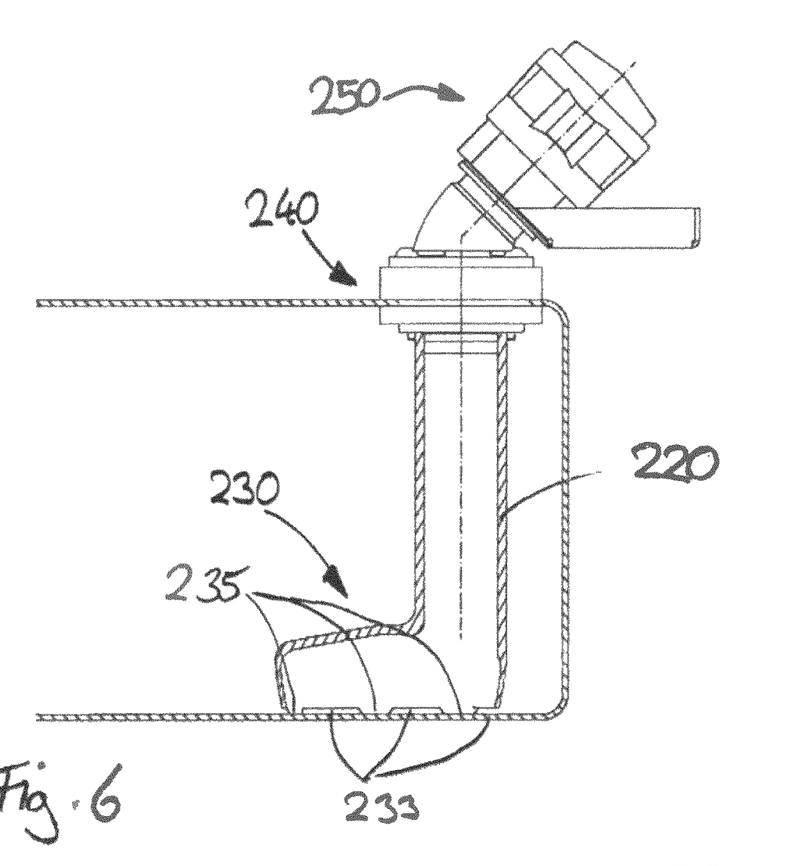
FIG. 6 is a third embodiment of the invention in a view according to FIG. 1.
Figure 6A:
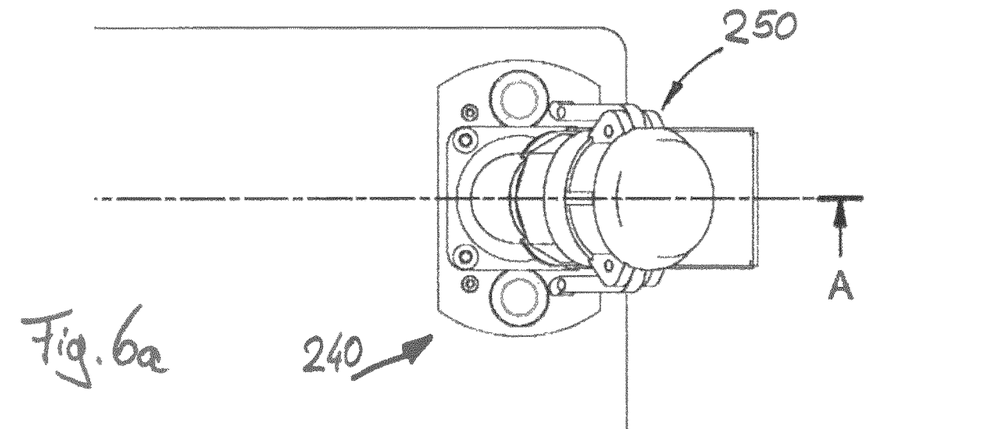
FIG. 6a is a plan view of the embodiment according to FIG. 6.

FIGS. 6 and 6a show a third embodiment of the invention, which, as far as the connection coupling 250 and fastening flange 240 are concerned, is, once again, structurally identical to the connection coupling 50 and fastening flange 40 explained above. Like the embodiment according to FIGS. 5 and 5a, the embodiment according to FIGS. 6 and 6a is equipped with an eccentric suction bell 230, which once again is formed in one piece on a suction tube 220. The suction bell 230 has a geometry that is different to that of the suction bell 130 shown in FIGS. 5 and 5a, but, like the suction bell according to FIGS. 5 and 5a, it is provided along its lower edge with a plurality of apertures 233, which are arranged between respective feet 235. These feet 235 are elastically deformable and, when there is an increase in negative suction pressure in the interior of the suction bell, can swing in in the inward direction in order to provide an increased through-passage cross section through the apertures 233.

Figure 7:
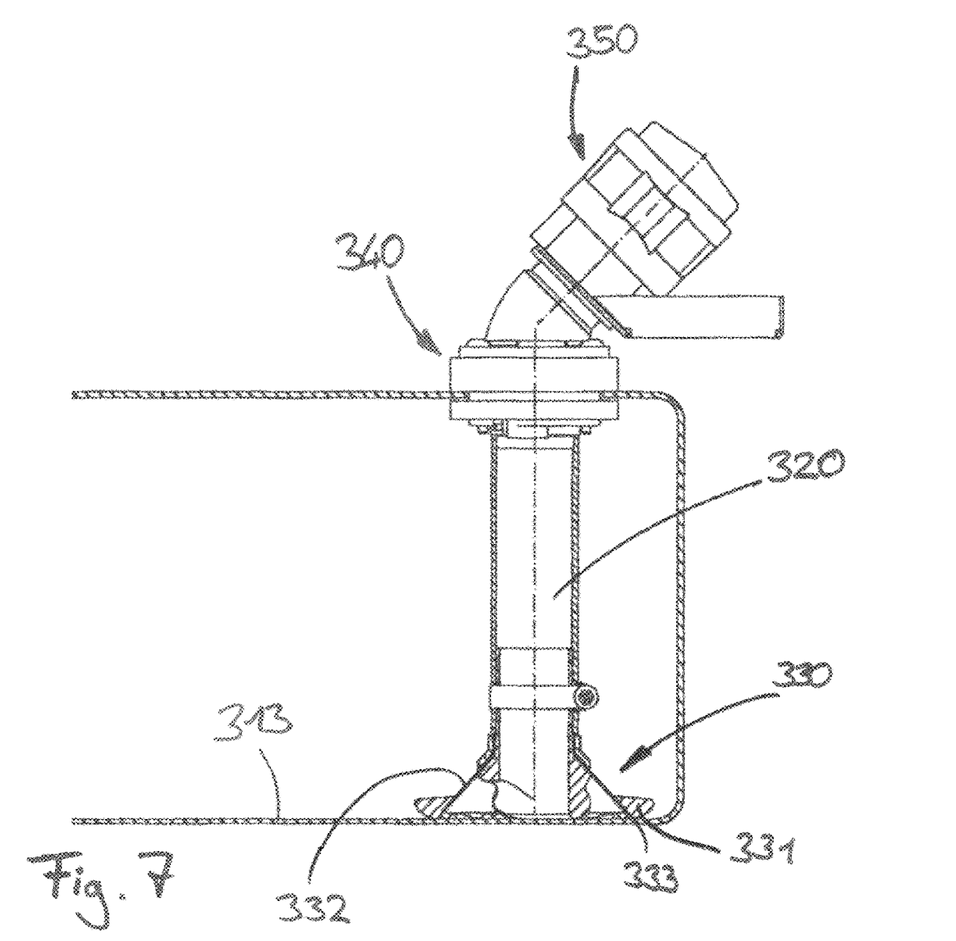
FIG. 7 is a fourth embodiment of the invention in a view according to FIG. 1.
Figure 7A:
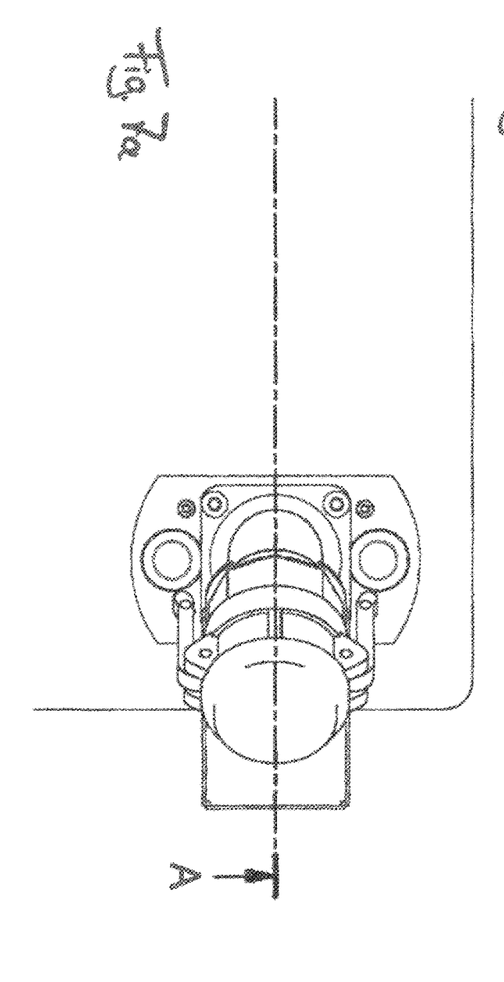
FIG. 7a is a plan view of the embodiment according to FIG. 7.

FIGS. 7 and 7a show a fourth embodiment of the invention, which, once again, as far as the connection coupling 350 and the fastening flange 340 are concerned, is structurally identical to the first embodiment. It is also the case with this fourth embodiment that a suction tube 320 extends vertically downwards within the wastewater-collection tank starting from the fastening flange 340. A suction bell 330 is fastened separately on said suction tube 320 and, therefore, in contrast to the first, second, and third embodiments, not in one piece therewith. The suction bell 330 has a base plate 331, which has such inherent stiffness that it cannot be deformed by the suction pressure within the suction bell 330. A plurality of lateral apertures or intake openings 333 are present in said baseplate 331 and allow the wastewater to enter into the interior of the suction bell 330.

The baseplate 331 is retained on the suction tube 320 by a deformable membrane 332, which widens downwards in funnel form. The baseplate 331 is retained in the lowered position, as shown in FIG. 7, and, therefore, supported on the floor 313 of the wastewater-collection tank by a said membrane. In this position, more or less complete emptying, with an advantageous vortexing action in the floor region in order to swirl up sediments, is possible. If, however, one or more of the intake openings 333, which operate in this position with a small through-passage cross section, becomes or become blocked, then there is an increase in the negative suction-extraction pressure in the suction bell 330. The increasing negative suction-extraction pressure acts on the baseplate 331 and raises the same, with the membrane 332 being deformed at the same time. The through-passage cross sections of the intake openings 333 are increased as a result, and solids can pass into the suction bell 330. As soon as the negative suction-extraction pressure in the suction bell 330 drops to a lower level again as a result of this blockage being broken up, the base plate 331 is moved back into the lowered position again as a result of the elastic restoring force of the membrane 331.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A sanitation system for a vehicle with a wastewater collection tank, the wastewater collection tank further comprising:
   a floor and a sidewall enclosing an interior of the wastewater collection tank;
   an inlet connection; and
   an outlet device, wherein the outlet device further comprises an outlet opening with a connection coupling for connecting a suction-extraction device, and a suction-extraction channel extending from the outlet opening in the direction of gravity down to an intake opening within the wastewater collection tank;
   wherein one or more intake openings are formed by apertures of which a through-passage cross section is delimited by the floor of the wastewater-collection tank and by an intake-opening periphery, wherein the intake-opening periphery is connected to a moveable negative-pressure surface and is retained in a first, lowered position by means of prestressing, and whereby:
   the intake opening in the first position, in which a first negative suction pressure in the suction-extraction channel acts on the negative-pressure surface, is arranged at a first distance from the tank floor; and
   the intake opening in a second position, in which a second negative suction pressure in the suction-extraction channel acts on the negative-pressure surface, said second negative suction pressure being higher than the first negative suction pressure, is arranged at a second distance from the tank floor, said second distance being greater than the first distance, in that the second negative suction pressure acting on the negative-pressure surface subjects the intake-opening periphery to a lifting force that acts counter to the prestressing and raises the intake-opening periphery to cause the through-passage cross section to be increased.

2. The sanitary system pursuant to claim 1, wherein the intake opening is spaced apart from the tank floor by a distance which is smaller than 10% of the overall height of the wastewater-collection tank.

3. The sanitary system as claimed in claim 1 having a suction bell of which the cross section dimension in the plane of the tank floor is greater than the cross section dimension of the suction-extraction channel in the plane of the tank floor, wherein the intake-opening periphery, which delimits the intake opening, and the negative-pressure surface are formed in one piece on the suction bell.

4. The sanitary system as claimed in claim 1, wherein the connection coupling is arranged above an angled portion relative the suction-extraction channel, wherein the angled portion is angled, starting from a through-passage direction in the region of the connection coupling, from 0° to 75° to the horizontal to a through-passage direction of from 75° to 105° to the horizontal in the region of the suction-extraction channel.

5. The sanitary system as claimed in claim 1, wherein the connection coupling is arranged above an angled portion relative the suction-extraction channel, wherein the angled portion is angled, starting from a through-passage direction in the region of the connection coupling, from 45° to the horizontal to a through-passage direction of 90° to the horizontal in the region of the suction-extraction channel.

6. The sanitary system as claimed in claim 1, wherein the connection coupling is a bayonet coupling or a screw-connection coupling.

7. A sanitation system for a vehicle with a wastewater collection tank, the wastewater collection tank further comprising:
   a floor and a sidewall enclosing an interior of the wastewater collection tank;
   an inlet connection; and
   an outlet device, wherein the outlet device further comprises an outlet opening with a connection coupling for connecting a suction-extraction device, and a suction-extraction channel extending from the outlet opening in the direction of gravity down to an intake opening within the wastewater collection tank;
   wherein the intake opening is formed on a suction bell, of which the cross section dimension in a plane parallel to the plane of the tank floor is greater than the cross section dimension of the suction-extraction channel in a plane parallel to the plane of the tank floor.

8. The sanitary system as claimed in claim 7, wherein the suction bell is arranged eccentrically in relation to a longitudinal axis of the suction-extraction channel.

9. The sanitary system as claimed in claim 7, wherein the suction bell is of a foldable design and can be deployed from a folded-in state, in which it has a first circumference in a direction transverse to the longitudinal extent of the suction-extraction channel, into a folded-out state, in which it has a second circumference in a direction transverse to the longitudinal extent of the suction-extraction channel, said second circumference being greater than the first circumference.

10. A wastewater-collection tank for a vehicle having a sanitary system installed therein, comprising:
   a floor and a sidewall that enclose a tank interior;
   an inlet connection; and
   an outlet device, wherein the outlet device further comprises:
   an outlet opening with a connection coupling for the connection of a suction-extraction arrangement; and
   a suction-extraction channel that extends from the outlet opening downward in the direction of gravitational force to an intake opening within the wastewater-collection tank;
   wherein one or more intake openings are formed by apertures of which a through-passage cross section is delimited by the floor of the wastewater-collection tank and by an intake-opening periphery, wherein the intake-opening periphery is connected to a moveable negative-pressure surface and is retained in a first, lowered position by means of prestressing, and whereby:
   the intake opening in the first position, in which a first negative suction pressure in the suction-extraction channel acts on the negative-pressure surface, is arranged at a first distance from the tank floor; and
   the intake opening in a second position, in which a second negative suction pressure in the suction-extraction channel acts on the negative-pressure surface, said second negative suction pressure being higher than the first negative suction pressure, is arranged at a second distance from the tank floor, said second distance being greater than the first distance, in that the second negative suction pressure acting on the negative-pressure surface subjects the intake-opening periphery to a lifting force that acts counter to the prestressing and raises the intake-opening periphery to cause the through-passage cross-section to be increased.

11. A retrofittable suction-extraction arrangement for a wastewater-collection tank of a sanitary system installed in a vehicle, comprising:
   an inlet connection; and
   an outlet device, wherein the outlet device further comprises an outlet opening with a connection coupling for the connection of a suction-extraction arrangement, and a suction-extraction channel that extends from the outlet opening downward in the direction of gravitational force to an intake opening within the wastewater-collection tank;
   wherein one or more intake openings are formed by apertures of which a through-passage cross section is delimited by the floor of the wastewater-collection tank and by an intake-opening periphery, wherein the intake-opening periphery is connected to a moveable negative-pressure surface and is retained in a first, lowered position by means of prestressing, and whereby:
   the intake opening in the first position, in which a first negative suction pressure in the suction-extraction channel acts on the negative-pressure surface, is arranged at a first distance from the tank floor; and
   the intake opening in a second position, in which a second negative suction pressure in the suction-extraction channel acts on the negative-pressure surface, said second negative suction pressure being higher than the first negative suction pressure, is arranged at a second distance from the tank floor, said second distance being greater than the first distance, in that the second negative suction pressure acting on the negative-pressure surface subjects the intake-opening periphery to a lifting force that acts counter to the prestressing and raises the intake-opening periphery to cause the through-passage cross section to be increased.

12. A method for emptying a wastewater-collection tank of a vehicle having a sanitary system installed therein, the method comprising the steps of:

arranging an intake opening within the wastewater-collection tank, above a tank floor;

connecting a suction-extraction arrangement to an outlet opening using a connection coupling; and extracting wastewater by suction from the wastewater-collection tank through a suction-extraction channel that connects the outlet opening to the intake opening and extends from the outlet opening downward in the direction of gravitational force to the intake opening;

wherein the one intake opening is formed on a suction bell and is delimited by the tank floor and by an intake-opening periphery, which is connected to a negative-pressure surface which is subjected to a negative suction pressure in the suction-extraction channel, and therefore the intake-opening periphery, and wherein:

at a first negative suction pressure in the suction-extraction channel, the intake periphery is retained, by means of prestressing, in a first position, in which the intake-opening periphery is arranged at a first distance from the tank floor; and at a second negative suction pressure in the suction-extraction channel, said second negative suction pressure being higher than the first negative suction pressure, the negative-pressure surface subjects the intake-opening periphery to a lifting force, which acts counter to the prestressing, and therefore, at the second negative suction pressure, the intake-opening periphery is moved into a second position, in which the intake-opening periphery is arranged at a second distance from the tank floor, said second distance being greater than the first distance.

13. The method as claimed in claim 12, wherein the intake-opening periphery is raised from the first position into the second position by part of a wall which delimits the suction bell deforming.

14. The method as claimed in claim 12, wherein the intake opening is spaced apart from the tank floor by a distance which is smaller than 10% of the overall height of the wastewater-collection tank, and is installed in a fixed state at the overall height.

* * * * *